3,238,136
ANTIFREEZE COMPOSITION
John G. Willard, Gayle D. Edwards, and Philip H. Moss, Austin, Tex., assignors to Jefferson Chemical Company, Inc., Houston, Tex., a corporation of Delaware
No Drawing. Filed July 1, 1963, Ser. No. 292,135
7 Claims. (Cl. 252—75)

This invention relates to improved antifreeze compositions. More particularly, this invention relates to substantially non-corrosive antifreeze compositions.

It is well known that uninhibited aqueous antifreeze solutions may cause corrosion of metals during service. Thus, an uninhibited aqueous antifreeze solution may be corrosive with respect to brass, copper, solder, steel, cast iron and cast aluminum in heat exchange systems such as the cooling systems of internal combustion engines. Solder, steel, cast iron and cast aluminum are particularly susceptible to corrosion.

In copending Willard et al. application, Serial No. 102,408, filed April 12, 1961, and entitled "Antifreeze Composition," there is disclosed a class of antifreeze compositions containing novel corrosion inhibitors which materially inhibit corrosion of materials. In particular, the Willard et al. application discloses and claims antifreeze compositions consisting essentially of a water soluble liquid alcohol freezing point depressant, a sodium borate, a magnesium borate, and a salt selected from the group consisting of sodium metaarsenite, sodium mercaptobenzothiazole, and mixtures thereof. While the results obtained in compositions of this nature have proven to be generally satisfactory, a special problem is encountered with an antifreeze composition containing only sodium metaborate and a mixture of sodium metaarsenite and sodium mercaptobenzothiazole in that corrosion of solder and aluminum occur with prolonged use of the composition. It has now been discovered that this problem may be overcome through a further modified antifreeze composition of the present invention wherein an alcohol type freezing point depressant has incorporated therein inhibiting amounts of an inhibitor composition consisting essentially of sodium metaborate, sodium metaarsenite, sodium mercaptobenzothiazole, and 2-mercaptothiazoline, and, optionally, a minor amount of a nonionic foam-suppressing surface active agent such as an ethylene oxide-capped polyoxypropylene glycol. Compositions of this nature are single phase antifreeze compositions which are foam-resistant, compatible with rubber hosing and which, moreover, provide superior corrosion protection to metals, including solder and aluminum.

Thus, it has been found that sodium metaarsenite, sodium mercaptobenzothiazole and 2-mercaptothiazoline act synergistically in combination with sodium metaborate to inhibit substantially completely the corrosion of solder, steel, cast iron, brass, copper and aluminum.

The freezing point depressants of the present invention include any of the water miscible liquid alcohols such as monohydyroxy lower alkyl alcohols and the liquid polyhydroxy alcohols such as the alkylene and dialkylene glycols. Specific examples of the alcohol contemplated herein are methanol, ethanol, propanol, isopropanol, butanol, ethylene glycol, diethylene glycol, propylene glycol, butylene glycol, and mixtures thereof. The freezing point depressant should generally constitute between about 10 and 100 volume percent (vol. percent) of the novel antifreeze composition. A preferred glycol is ethylene glycol, which as sold commercially often contains a small amount, up to 10% by weight, of diethylene glycol. The term ethylene glycol as used herein is intended to include either the pure or commercial compound. This is also true of the other freezing point depressant alcohols contemplated herein.

One of the inhibitor components of the present invention is sodium metaborate. The quantity of sodium metaborate to be employed in the antifreeze compositions of the present invention should generally be between about 0.1 and 3.0 weight percent (wt. percent) based on the weight of the inhibited alcohol freezing point depressant. More preferably, the composition will contain from about 0.5 to about 2 wt. percent of sodium metaborate.

A second component of the inhibitor composition of the present invention is 2-mercaptothiazoline. The quantity of 2-mercaptothiazoline to be employed in the antifreeze composition of the present invention is within the range from about 0.01 to about 1.0 wt. percent, based on the weight of the inhibited alcohol freezing point depressant. More preferably, from about 0.1 to about 1.0 wt. percent of 2-mercaptothiazoline will be employed.

Another component of the inhibitor composition of the present invention is sodium metaarsenite. It is generally desirable to utilize from about 0.05 to about 2 wt. percent of sodium metaarsenite, based on the weight of the inhibited alcohol freezing point depressant. More preferably, from about 0.1 to about 1.5 wt. percent of sodium metaarsenite is employed.

A third component of the present invention is sodium mercaptobenzothiazole. It is generally desirable to utilize from about 0.01 to about 1 wt. percent of sodium mercaptobenzothiazole, based on the weight of the uninhibited alcohol freezing point depressant. More preferably, from about 0.1 to 1 wt. percent of sodium mercaptobenzothiazole will be employed.

When the antifreeze composition is to be utilized in a heat exchange system, it may be combined with water in any and all proportions. When aqueous solutions of the novel antifreeze are to be used as coolants in automotive cooling systems, the water miscible liquid alcohol freezing point depressant should generally constitute at least about 10 vol. percent, preferably between about 20 and 65 vol. percent of the aqueous antifreeze solution. The corresponding water content should therefore constitute less than about 90 vol. percent, preferably between about 35% and 80% by volume of the aqueous antifreeze solution.

It will be understood that the antifreeze compositions of the present invention may also contain conventional additives such as dyes, antifoam agents, etc. For example, suitable antifoam agents include silicone emulsions and polyglycols. Especially efficient polyglycol antifoam agents are block copolymers prepared by adding ethylene oxide to a polypropylene glycol, for example, "Pluronic L–61," a product of the Wyandotte Chemical Company.

It is to be noted that the freezing point of the aqueous antifreeze coolants is substantially determined by relative component quantities and particular freezing point depressant used therein. For example, in an aqueous ethylene glycol solution a minimum freezing point within the range of approximately −60° to −90° F. is obtained with about 65% ethylene glycol by volume.

The invention will be further illustrated by the following specific examples which are given by way of illustration and not as limitations on the scope of this invention.

EXAMPLE I

This example illustrates the improved corrosion results that are obtained in accordance with the present invention as contrasted with antifreeze compositions which do not contain recited inhibitor components within the recited range.

An antifreeze formulation was prepared by heating 4,762 g. of ethylene glycol to 50° C. in a glass-lined vessel, followed by the addition of 55 g. of water and 37.1 g. of a 50% aqueous solution of sodium hydroxide. After 5 minutes of agitation, 67.5 g. of borax pentahydrate were added and agitation was continued for an additional 15 minutes to dissolve the borax. Thereafter, 50 g. of a 40% solution of sodium arsenite and 15 g. of a 50% solution of sodium mercaptobenzothiazole were added. Next, 7.5 g. of 2-mercaptothiazoline were added and the resulting mixture was agitated for 15 minutes. Finally, 5 g. of a foam depressant (reaction product of ethylene oxide with polyoxypropylene glycol, known as Pluronic L-61) were added with agitation. The resulting antifreeze had the following composition.

*Table I*

| | Wt. percent |
|---|---|
| Ethylene glycol | 95.25 |
| Water | 2.73 |
| Sodium metaborate, $NaBO_2$ | 1.22 |
| Sodium arsenite, $NaAsO_2$ | 0.40 |
| NaMBT | 0.15 |
| 2-MT | 0.15 |
| Pluronic L-61[1] | 0.10 |

[1] Antifoam agent.

Portions of the above-identified antifreeze formulation were subjected to engine dynamometer tests to determine corrosivity, one dynamometer test being conducted for 670 hours and the other being conducted for 1,200 hours.

The dynamometer test was run using a 1961 Ford six-cylinder engine, equipped with an aluminum water outlet, standard radiator and supply tank. Corrosion was evaluated using ASTM Corrosion Test Metal Coupons as described in ASTM Method D1384. An eddy current dynamometer with suitable controls, indicators and records to operate and control the test was used. The test radiator was immersed in a cooling tank and the engine coolant was maintained at 185±5° F. by controlling the flow of water in the cooling tank. The corrosion test coupons were mounted in a holder which was located between the supply tank and the radiator and which was electrically grounded to the engine block and radiator. The cooling system was cleaned prior to each test by flushing it consecutively with kerosene, isopropanol and hot water, followed by an oxalic acid cooling system cleaner and neutralizer.

The engine components were assembled to provide a complete system with the coolant circulating through the block, radiator and supply tank. Test coupons were removed at approximately 100 hour intervals to evaluate the amount of corrosion. The antifreeze was tested as a 50% solution in Detroit tap water. The engine speed was held at 2,800 r.p.m. (equivalent to 60 m.p.h.), and the engine output maintained at 35 horsepower. The results are set forth in Tables II and III.

*Table II*
670-HOUR ENGINE DYNAMOMETER TEST

| Operating Interval, Hours | No. of Sets of Coupons | Corrosion Results, Wt. Loss, Mg./Sq. In. | | | | | |
|---|---|---|---|---|---|---|---|
| | | Brass | Copper | Solder | Steel | Iron | Aluminum |
| 0–106 | 3 | 0 | 0 | 7 | −2 | −2 | 9 |
| 106–202 | 3 | 0 | 0 | 5 | −2 | −2 | 7 |
| 202–297 | 3 | 0 | 0 | 7 | −2 | −2 | 11 |
| 297–397 | 3 | 0 | −1 | 6 | −3 | −3 | 10 |
| 397–540 | 1 | 0 | −1 | 9 | −1 | −1 | 14 |
| 540–670 | 1 | 0 | 0 | 5 | −2 | −2 | 16 |
| 0–302 | 1 | 1 | 0 | 16 | 0 | 0 | 9 |
| 302–670 | 1 | 0 | 0 | 10 | −3 | −4 | 11 |
| 0–670 | 2 | 3 | 2 | 9 | −1 | −1 | 6 |

*Table III*
1200-HOUR ENGINE DYNAMOMETER TEST

| Operating Interval, Hours | No. of Sets of Coupons | Corrosion Results, Wt. Loss, Mg./Sq. In. | | | | | |
|---|---|---|---|---|---|---|---|
| | | Brass | Copper | Solder | Steel | Iron | Aluminum |
| 0–109 | 1 | 1 | 1 | 5 | 0 | 0 | 5 |
| 109–248 | 1 | 1 | 1 | 3 | −2 | −2 | 11 |
| 248–339 | 1 | 1 | 1 | 2 | −5 | −6 | 15 |
| 339–454 | 1 | 1 | 1 | 2 | −3 | −4 | 13 |
| 454–571 | 1 | 0 | 0 | 5 | −7 | −8 | 11 |
| 571–660 | 1 | 0 | 0 | 4 | −5 | −3 | 8 |
| 660–775 | 1 | 0 | 0 | 6 | −4 | −2 | 7 |
| 775–884 | 1 | 0 | 0 | 4 | −7 | −2 | 8 |
| 884–977 | 1 | 0 | 0 | 5 | −9 | −8 | 9 |
| 977–1,095 | 1 | 0 | 0 | 6 | −6 | −6 | 9 |
| 1,095–1,200 | 1 | 0 | 0 | 2 | −5 | −5 | 11 |
| 0–660 | 1 | 4 | 5 | 5 | 0 | 0 | 7 |
| 660–1,200 | 1 | 2 | 2 | 4 | −3 | −3 | 10 |
| 0–1,200 | 3 | 5 | 6 | 6 | 0 | 0 | 6 |

As will be seen from the above results, the antifreeze composition of the present invention was substantially completely non-corrosive with respect to the metals normally encountered in a heat exchange system.

EXAMPLE II

The preparation of the sample was the same as Example I, except that the 7.5 g. of 2-mercaptothiazoline was not added and the amount of water changed from 55 g. to 62.5 g.

| Composition of Example II: | Wt. percent |
|---|---|
| Ethylene glycol | 95.25 |
| Water | 2.88 |
| Sodium metaborate, $NaBO_2$ | 1.22 |
| Sodium arsenite, $NaAsO_2$ | 0.40 |
| NaMBT | 0.15 |
| Pluronic L-61 | 0.10 |

The results that were obtained on a 428-hour engine dynamometer test are set forth in Table IV.

Table IV
428-HOUR ENGINE DYNAMOMETER TEST

| Operating Interval, Hours | No. of Sets of Coupons | Corrosion Results, Wt. Loss, Mg./Sq. In. | | | | | |
|---|---|---|---|---|---|---|---|
| | | Brass | Copper | Solder | Steel | Iron | Aluminum |
| 0-110 | 3 | 1 | 1 | 11 | 0 | 0 | 12 |
| 110-226 | 1 | 1 | 1 | 10 | 0 | 0 | 15 |
| 226-315 | 1 | 1 | 1 | 10 | 0 | 0 | 12 |
| 315-425 | 1 | 1 | 1 | 17 | 0 | 0 | 15 |
| 0-425 | 1 | 2 | 2 | 20 | 0 | 0 | 22 |
| 0-428 | 2 | 2 | 3 | 31 | 0 | 0 | 13 |

EXAMPLE III

The preparation of the sample was the same as Example I, except that 50 g. of dipotassium phosphate, $K_2HPO_4$, were added instead of 7.5 g. of 2-mercaptothiazoline, and the amount of water changed from 55 g. to 12.5 g.

Composition of Example III:  Wt. percent
- Ethylene glycol — 95.25
- Water — 1.88
- Sodium metaborate, $NaBO_2$ — 1.22
- Sodium arsenite, $NaAsO_2$ — 0.40
- NaMBT — 0.15
- Dipotassium phosphate, $K_2HPO_4$ — 1.00
- Pluronic L-61 — 0.10

The results are set forth in Table V.

Table V
670-HOUR ENGINE DYNAMOMETER TEST

| Operating Interval, Hours | No. of Sets of Coupons | Corrosion Results, Wt. Loss, Mg./Sq. In. | | | | | |
|---|---|---|---|---|---|---|---|
| | | Brass | Copper | Solder | Steel | Iron | Aluminum |
| 0-125 | 3 | 1 | 1 | 9 | 1 | 1 | 1 |
| 125-258 | 1 | 1 | 2 | 11 | 0 | 0 | 1 |
| 258-354 | 1 | 2 | 2 | 10 | 0 | 0 | 1 |
| 354-508 | 1 | 2 | 3 | 18 | 0 | 0 | 2 |
| 508-670 | 1 | 2 | −1 | 19 | 0 | 0 | 2 |
| 0-354 | 1 | 3 | 4 | 24 | 5 | 1 | 1 |
| 354-670 | 1 | 2 | −3 | 33 | 1 | 0 | 2 |
| 0-670 | 2 | 6 | −2 | 47 | 7 | 2 | 1 |

As can be seen from Table IV, in the absence of 2-mercaptothiazoline, unsatisfactory results were obtained in that the antifreeze composition was moderately corrosive with respect to aluminum and, with time, progressively more corrosive with respect to solder.

As can be seen from Table V, the use of dipotassium phosphate in lieu of 2-mercaptothiazoline was also unsatisfactory in that excessive solder corrosion was encountered with time.

Having thus described our invention, what is claimed is:

1. An antifreeze composition adapted to be added to water consisting essentially of a water soluble liquid alcohol freezing point depressant, between about 0.1 and 3 wt. percent of sodium metaborate, about 0.05 to 2.0 wt. percent of sodium metaarsenite, about 0.01 to about 1.0 wt. percent of sodium mercaptobenzothiazole and about 0.01 to about 1 wt. percent of 2-mercaptothiazoline, based on the weight of the liquid alcohol freezing point depressant.

2. An antifreeze composition as in claim 1 wherein the liquid alcohol freezing point depressant is ethylene glycol.

3. An antifreeze composition adapted to be added to water consisting essentially of ethylene glycol, between about 0.5 to 2 wt. percent of sodium metaborate, from about 0.1 to about 1.5 wt. percent of sodium metaarsenite, from about 0.1 to about 1 wt. percent of sodium mercaptobenzothiazole and from about 0.1 to about 1 wt. percent of 2-mercaptothiazoline, based on the weight of the ethylene glycol.

4. An aqueous coolant consisting essentially of between about 20 to 65 vol. percent of an antifreeze composition and between about 35 and 80 vol. percent of water, said antifreeze composition consisting essentially of a water soluble liquid alcohol freezing point depressant, from about 0.1 to about 3 wt. percent of sodium metaborate, from about 0.05 to about 2 wt. percent of sodium metaarsenite, from about 0.01 to about 1 wt. of sodium mercaptobenzothiazole and from about 0.01 to about 1 wt. percent of 2-mercaptothiazoline.

5. A coolant as in claim 4 wherein the liquid alcohol freezing point depressant is ethylene glycol.

6. A process for inhibiting the corrosion of metals which come in contact with an antifreeze composition, which comprises contacting the surface of the metal to be inhibited against corrosion with an antifreeze composition consisting essentially of a water soluble liquid alcohol freezing point depressant, from about 0.1 to about 3 wt. percent of sodium metaborate, from about 0.05 to about 2 wt. percent of sodium metaarsenite, from about 0.01 to about 1 wt. percent of sodium mercaptobenzothiazole and from about 0.01 to 1 wt. percent of 2-mercaptothiazoline, based on the weight of the ethylene glycol, said aqueous coolant consisting essentially of between about 20 to about 65 vol. percent of said antifreeze composition and from about 35 to about 80 vol. percent of water, said metals being selected from the group consisting of ferrous metals, cuprous metals, aluminum and solder.

7. A process as in claim 6 wherein the liquid alcohol freezing point depressant is ethylene glycol.

References Cited by the Examiner
UNITED STATES PATENTS 2,861,954  11/1958  Ruff _____ 252—137 XR
3,046,230  7/1962  Berger _____ 252—75

JULIUS GREENWALD, *Primary Examiner.*
ALBERT T. MEYERS, *Examiner.*
J. D. WELSH, *Assistant Examiner.*